US008316430B2

(12) United States Patent
Mirza-Baig (10) Patent No.: US 8,316,430 B2
(45) Date of Patent: Nov. 20, 2012

(54) PREVENTING NETWORK TRAFFIC BLOCKING DURING PORT-BASED AUTHENTICATION

(75) Inventor: Attaullah Mirza-Baig, Santa Clara, CA (US)

(73) Assignee: Ricoh Company, Ltd., Tokyo (JP)

( * ) Notice: Subject to any disclaimer, the term of this patent is extended or adjusted under 35 U.S.C. 154(b) by 1067 days.

(21) Appl. No.: 11/544,116

(22) Filed: Oct. 6, 2006

(65) Prior Publication Data

US 2008/0084879 A1  Apr. 10, 2008

(51) Int. Cl.
H04L 12/56 (2006.01)
(52) U.S. Cl. .................. 726/13; 726/3; 726/14
(58) Field of Classification Search .......... None
See application file for complete search history.

(56) References Cited

U.S. PATENT DOCUMENTS

| | | | | |
|---|---|---|---|---|
| 6,463,474 | B1 * | 10/2002 | Fuh et al. ................ | 709/225 |
| 7,434,254 | B1 * | 10/2008 | Foschiano et al. ........ | 726/13 |
| 2003/0095663 | A1 | 5/2003 | Nelson et al. | |
| 2003/0152035 | A1 * | 8/2003 | Pettit et al. ............. | 370/252 |
| 2004/0093400 | A1 * | 5/2004 | Richard et al. ........... | 709/222 |
| 2004/0093522 | A1 * | 5/2004 | Bruestle et al. .......... | 713/201 |
| 2004/0268140 | A1 * | 12/2004 | Zimmer et al. ........... | 713/200 |
| 2005/0050352 | A1 | 3/2005 | Narayanaswami et al. | |
| 2005/0125692 | A1 * | 6/2005 | Cox et al. .............. | 713/201 |
| 2006/0067272 | A1 * | 3/2006 | Wang et al. ............. | 370/331 |
| 2007/0049252 | A1 * | 3/2007 | Smith et al. ............ | 455/411 |
| 2007/0050839 | A1 | 3/2007 | Dharanikota et al. | |
| 2007/0162607 | A1 * | 7/2007 | Droms et al. ........... | 709/228 |

OTHER PUBLICATIONS

Cisco, Catalyst 3550 Multilayer Switch Software Configuration Guide, Dec. 2002, Cisco, Chapter 9.*
R. Droms, "Dynamic Host Configuration Protocol," Internet Engineering Task Force (IETF) Network Working Group Request for Comments (RFC) 2131, Mar. 1997, pp. 1-37.
S. Alexander et al., "DHCP Options and BOOTP Vendor Extensions," IETF RFC 2132, Mar. 1997, pp. 1-28.
L. Strand, "802.1X Port-Based Authentication HOWTO," published by Lars Strand, Aug. 18, 2004, pp. 1-29.
Anonymous, "Configuring 802.1X Port-Based Authentication," published by Cisco Systems, Inc., Mar. 21, 2005, pp. 1-18.
Droms, R. Dynamic Host Control Protocol. Published by Internet Engineering Task Force [online], Mar. 1997 [retrieved on Sep. 11, 2008]. pp. 1-43. Retrieved from the Internet: <URL: http://www.ietf.org/rfc/rfc2131.txt>.

(Continued)

Primary Examiner — William J. Goodchild
Assistant Examiner — Samuel Ambaye
(74) Attorney, Agent, or Firm — Hickman Palermo Truong Becker Bingham Wong LLP (57) ABSTRACT

A network device is allowed to transmit only authentication protocol traffic and no other traffic on an interface that is coupled to a port using port-based authentication until after authentication succeeds. An apparatus comprises a network interface; a packet filter coupled to the network interface; an authentication module coupled to the packet filter; a timer module coupled to the authentication module; wherein the authentication module comprises logic which when executed causes: configuring the packet filter to permit transmitting on the interface packets of an authentication protocol and to block transmitting all other packets; causing the timer module to start a timer; in response to receiving a packet of the authentication protocol before the timer reaches the expiration time, causing the timer module to disable the timer, transmitting one or more other authentication protocol packets until successfully authenticating the apparatus, and then configuring the packet filter to permit transmitting all packets.

28 Claims, 5 Drawing Sheets

OTHER PUBLICATIONS

Alexander, S. DHCP Options and BOOTP Vendor Extensions. Published by Network Working Group [online] Mar. 1997 [retrieved on Sep. 11, 2008]. pp. 1-27. Retrieved from the Internet: <URL: http://www.faqs.org/rfcs/rfc2132.html>.

Strand, L. 801.X Port-Based Authentication HOWTO. Published by The Linux Documentation Project [online] Aug. 2004 [retrieved on Sep. 11, 2008]. pp. 1-23. Retrieved from the Internet: <URL: http://tldp.org/HOWTO/html_single/8021X-HOWTO/>.

Anonymous. Configuring 802.1X Port-Based Authentication. Published by Cisco Systems [online] Mar. 2005 [retrieved on Sep. 11, 2008]. pp. 1-11. Retrieved from the Internet: <URL: http://www.cisco.com/en/US/docs/switches/lan/catalyst3560/software/release/12.1_19_ea1/configuration/guide/sw8021x.html >.

U.S. Appl. No. 11/728,109, filed Mar. 22, 2007, Final Office Action, Jul. 28, 2011.

* cited by examiner

PREVENTING NETWORK TRAFFIC BLOCKING DURING PORT-BASED AUTHENTICATION

FIELD OF THE INVENTION

The present invention generally relates to network data processing. The invention relates more specifically to port-based authentication of network devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In port-based authentication, a network end station device such as a multifunction printer, personal computer, or server cannot access a network through a physical port or logical port of a network infrastructure element, such as a router or switch, until the end station authenticates to the infrastructure element. To perform authentication, upon detecting packets on a port the infrastructure element requests the end station to provide a credential, and the infrastructure element verifies or validates the credential by communicating with an authentication, authorization and accounting (AAA) server over a protocol such as RADIUS or TACACS+.

Performing authentication requires time for the end station device and the infrastructure element to communicate several messages, for the infrastructure device to communicate with the AAA server, and for the AAA server to look up and validate the credential in a secure database. However, before the authentication process completes, other processes in the end station device may attempt to send traffic on the port. For example, in a device that uses Dynamic Host Control Protocol (DHCP) as defined in IETF RFC*, a DHCP client may attempt to send a DHCPREQUEST message to obtain a leased IP address before the authentication process completes.

In this environment, adverse consequences can occur. Upon receiving DHCP or other traffic from a non-authenticated device, an infrastructure element may shut down the port, ending all communication on the port including authentication messages, causing authentication to fail. In that event, a network administrator must use a console command or the equivalent to instruct the infrastructure element to re-open the port. This is undesirable because manual work is involved, and the end station device may be unusable on the network until the infrastructure element is re-configured. In other cases, the infrastructure element may silently drop the unauthorized traffic; as a result, the end station device may time out in seeking a dynamic address under DHCP, and then may default to a stored static IP address since it is unable to obtain a dynamic address. The use of the static IP address may provide the network device with limited connectivity or other problems.

The Microsoft Windows XP DHCP client attempts to address this issue by re-sending DHCPREQUEST packets periodically at different time intervals. However, some infrastructure elements still respond by shutting down ports that are connected to non-authenticated devices.

SUMMARY

Techniques for preventing network traffic blocking during port-based authentication are provided. In one aspect, the invention provides a method with which a network device is only allowed to transmit authentication protocol traffic, and no other traffic, on an interface that is coupled to a port using port-based authentication until after authentication succeeds.

In another aspect, an apparatus comprises a network interface; a packet filter coupled to the network interface; an authentication module coupled to the packet filter; and a timer module coupled to the authentication module. The authentication module comprises logic which when executed causes: configuring the packet filter to permit transmitting on the interface packets of an authentication protocol and to block transmitting all other packets; causing the timer module to start a timer; in response to receiving a packet of the authentication protocol before the timer reaches the expiration time, causing the timer module to disable the timer, transmitting one or more other authentication protocol packets until successfully authenticating the apparatus, and then configuring the packet filter to permit transmitting all packets.

In one feature of this aspect, the authentication module comprises further logic which when executed causes configuring the packet filter to permit transmitting all packets when the timer reaches the expiration time and no authentication protocol packet has been received.

In another feature, the authentication protocol is based on Extensible Authentication Protocol (EAP) or IEEE 802.1x authentication. In a related feature, the authentication protocol is any one of EAP-SIM, EAP-TLS, LEAP, EAP-AKA, PEAP, EAK-SKE, EAP-MSCHAP-V2, EAP-GSS, and EAP-TTLS. In yet another feature, the authentication protocol is any one of EAP-MD5, EAP-OTP, or EAP-SECUREID when used in conjunction with PEAP.

In a further feature, the network interface is configured to couple to a port of an authenticator. In still a further feature, a Dynamic Host Control Protocol (DHCP) client comprises logic which when executed is operable to send a DHCPREQUEST message to the authenticator.

In yet another feature, a Dynamic Host Control Protocol (DHCP) client comprises logic which when executed is operable to send a DHCPREQUEST message to the authenticator, and the specified expiration time is greater than or equal to a boot delay of the apparatus.

In still another feature, the apparatus comprises a multifunction printer.

In yet a further feature, the authentication module further comprises logic which when executed is operable to determine one or more time values representing actual boot delays of the apparatus for a plurality of boot-up events; store in nonvolatile memory of the apparatus an average actual boot delay of the apparatus based on the one or more time values; and determine the specified expiration time for the timer module based on the average actual boot delay of the apparatus.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described according to the following outline:

| | |
|---|---|
| 1.0 | Structural Overview |
| 2.0 | Functional Overview |
| 3.0 | Hardware Overview |
| | * * * |

1.0 Structural Overview

Figure 1:
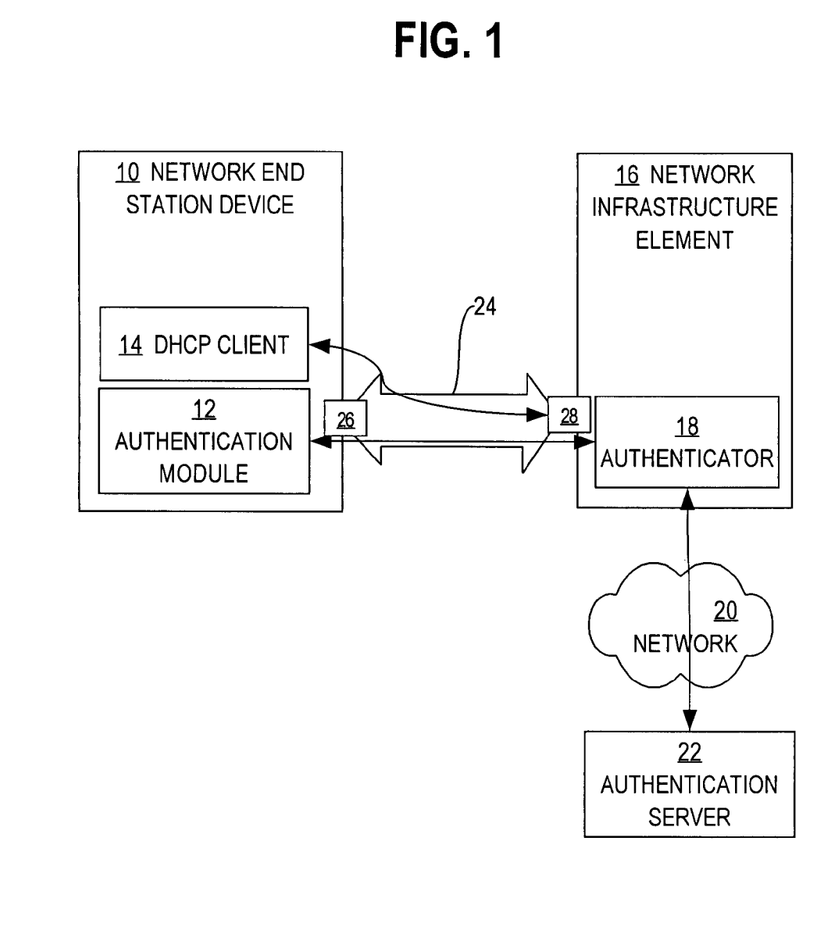
FIG. 1 is a block diagram of an example network context in which an embodiment may be used.
Figure 2:
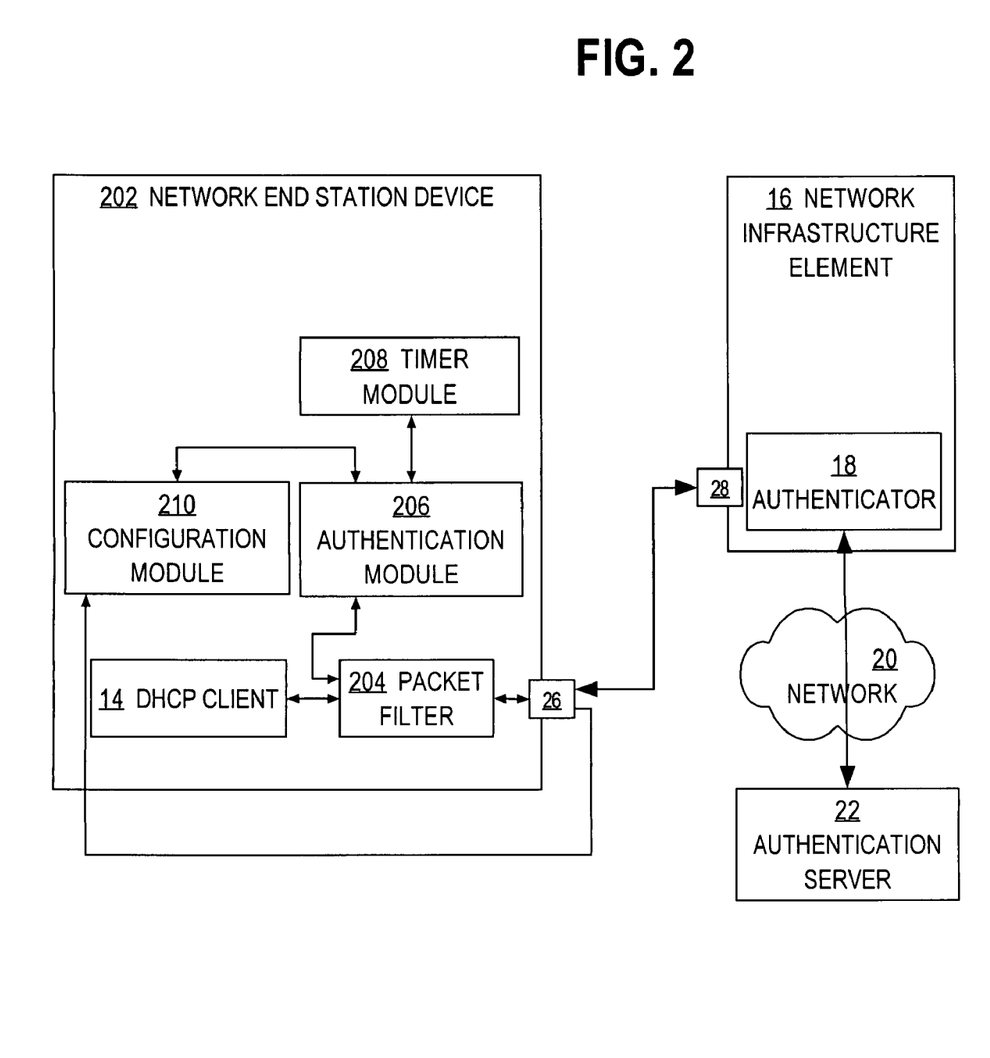
FIG. 2 is a block diagram of a network end station device according to an embodiment.

FIG. 1 is a block diagram of an example network context in which an embodiment may be used. FIG. 2 is a block diagram of a network end station device according to an embodiment. Referring first to FIG. 1, a network end station device 10 is coupled by interface 26 and link 24 to an interface 28 of a network infrastructure element 16, which is coupled directly or indirectly through one or more networks 20 to an authentication server 22. End station device 10 comprises a multi-function printer, personal computer, workstation, or other network endpoint. In an embodiment, end station device 10 is a RICOH AFICIO multifunction printer from Ricoh Co., Ltd., Yokohama, Japan, and comprises an authentication module 12 and DHCP client 14.

Network infrastructure element 16 comprises an authenticator 18. In an embodiment, infrastructure element 16 is a router, switch, gateway, or other network access device. Interface 28 comprises either a physical port or logical port of infrastructure element 16.

In an embodiment, authentication server 22 is an authentication, authorization and accounting (AAA) server, such as the Microsoft RADIUS Server, or CiscoSecure ACS from Cisco Systems, Inc., that has secure storage of user credentials. The authentication server 22 communicates with authenticator 18 using an authentication protocol such as Remote Access Dial-in User Service (RADIUS) or TACACS+. In such an arrangement, authenticator 18 is an AAA client of the authentication server 22. Thus, a complete authentication sequence involves authentication module 12, authenticator 18, and authentication server 22.

Both authentication module 12 and DHCP client 14 communicate over link 24 using separate protocol messages. Thus, an issue with the arrangement of FIG. 1 is that DHCP client 14 may attempt to communicate DHCP messages on link 24 to interface 28 before authenticator 18 has authenticated end station device 10 on interface 28. In response, infrastructure element 16 may determine that the DHCP messages are unauthorized traffic and may shut down interface 28.

Referring now to FIG. 2, in an embodiment, network end station device 202 comprises a packet filter 204 that is coupled to interface 26 and that is configured to filter packets before the packets are transmitted on interface 26. Packet filter 204 has an input coupled to DHCP client 14 and therefore the packet filter can filter DHCP messages coming from the device 202 before the DHCP messages are transmitted on interface 26.

Packet filter 204 also has an input coupled to authentication module 206 that can receive and filter packets or messages formatted according to an authentication protocol before the authentication protocol packets are sent on interface 26. Authentication module 206 is configured to perform authentication of device 202 according to an authentication protocol such as RADIUS or TACACS+based on stored device credentials such as a username-password, digital certificate, device identifier, or other credentials.

Authentication module 206 is coupled to a timer module 208 that can perform timing of a specified time value or expiration period and signal the authentication module when the time has expired. Authentication module 206 is coupled to a configuration module 210 that can receive user input of configuration commands on interface 26 or on a console interface and can configure the authentication module. For example, configuration may be used to set passwords or other credentials, change encryption key strength, change authentication mechanisms, change the specified expiration value of the timer module 208, etc.

The timer module 208, configuration module 210, authentication module 206, packet filter 204 and DHCP client 14 may be implemented in one or more computer programs or other software elements that perform the functions described herein.

2.0 Functional Overview

Generally, using the techniques herein a network end station device is allowed to transmit only authentication protocol traffic, and no other traffic, on an interface that is coupled to a port that is using port-based authentication, until after authentication succeeds or until after a specified timeout occurs. The timeout is typically selected to be just longer than a boot delay of the end station device.

Figure 3:
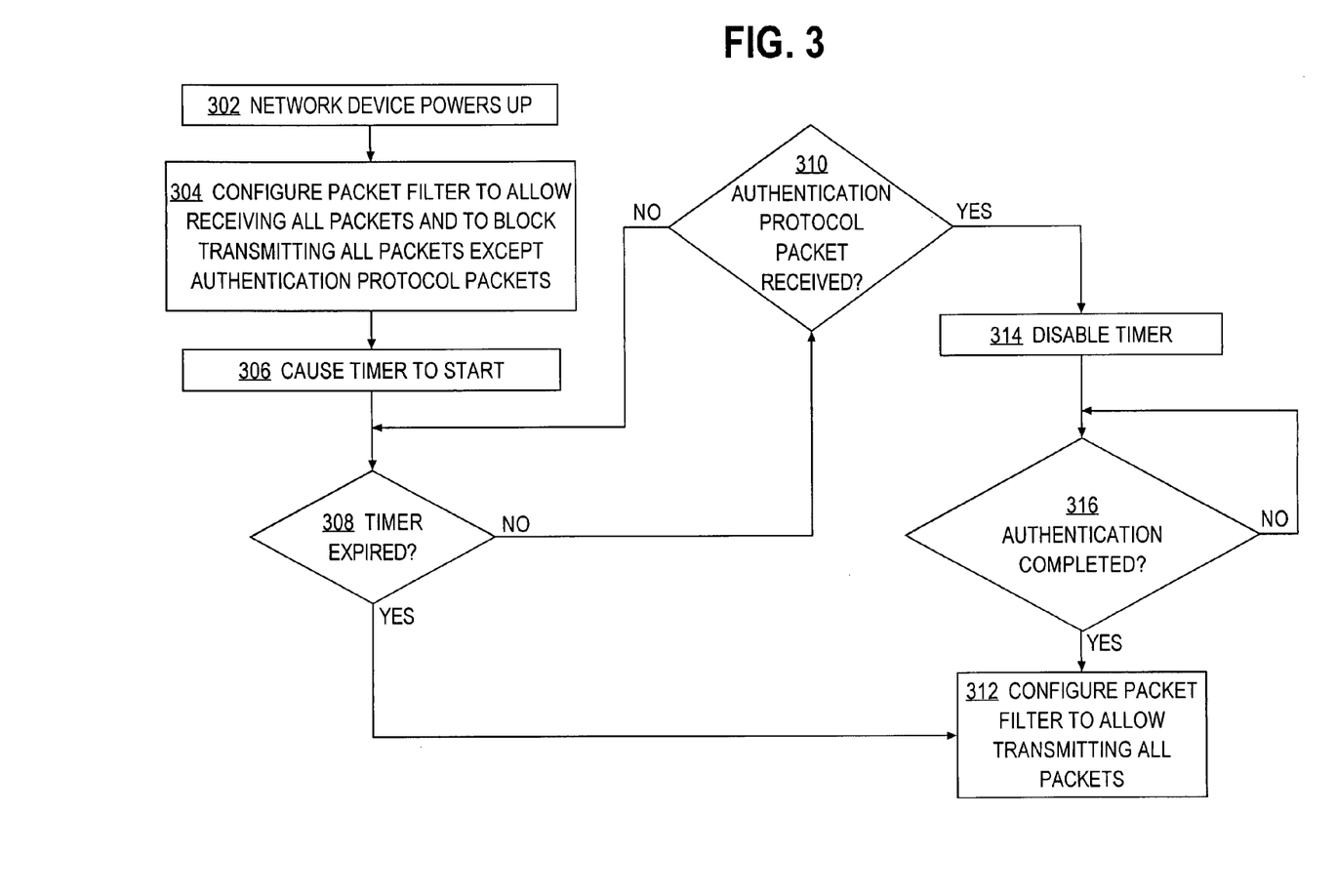
FIG. 3 is a flow diagram of a process of performing port-based authentication.
Figure 4:
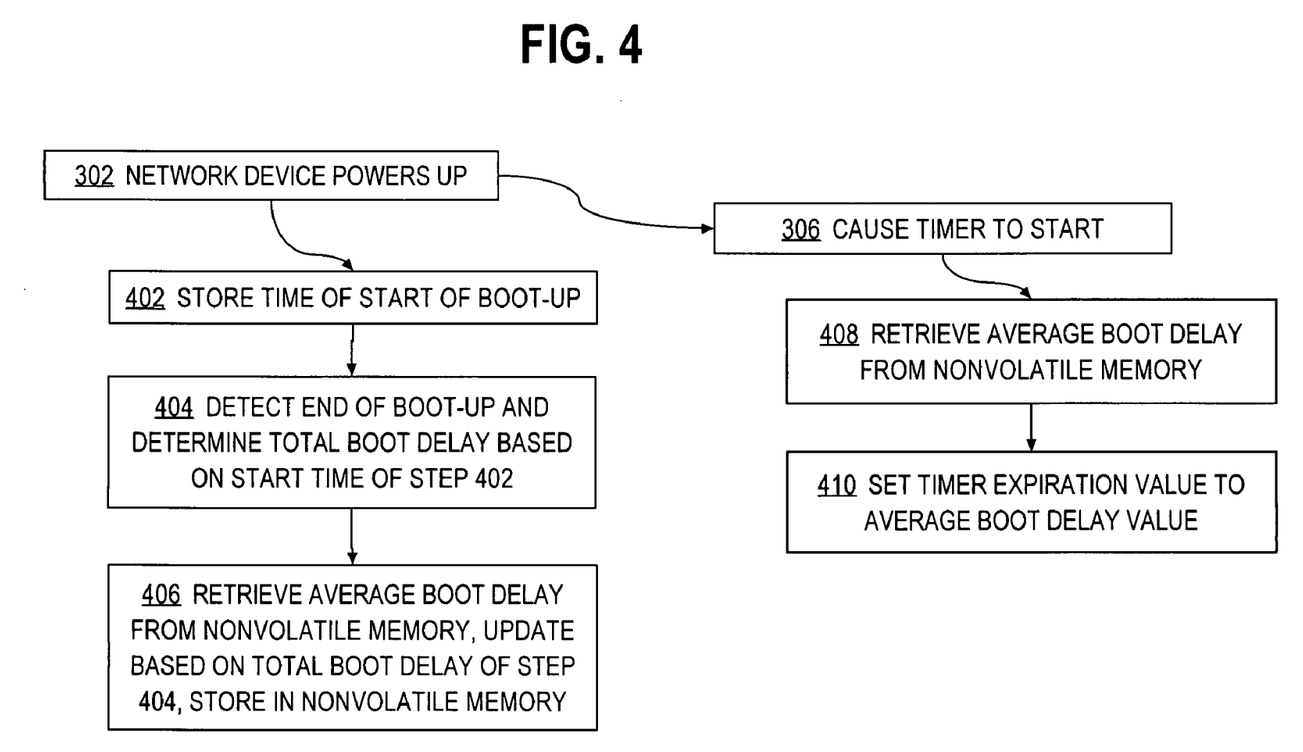
FIG. 4 is a flow diagram of a process of adaptively determining a timer period.

FIG. 3 is a flow diagram of a process of performing port-based authentication. FIG. 4 is a flow diagram of a process of adaptively determining a timer period. Referring first to FIG. 3, in step 302 a network device powers up. For example, power is applied to device 202, which performs a power-up or boot-up sequence to move from a non-powered state to a powered, functional state.

In step 304, a packet filter is configured to allow receiving all packets, and to block transmitting all packets except for authentication protocol packets. For example, authentication module 206 configures packet filter 204 to permit transmitting authentication protocol packets from the authentication module, but to block transmitting DHCP packets from DHCP client 14 or other packets from other functional elements.

Step 304 is typically performed relatively early in a boot-up sequence of the device so that the device cannot send any packets on a network interface except for authentication protocol packets. Further, using this approach the DHCP client 14 or other functional elements cannot send traffic on interface 26 before the device 202 successfully authenticates to infrastructure element 16. Blocking outgoing DHCP traffic does not have adverse consequences because most DHCP clients are configured to retry sending DHCPREQUEST packets to obtain a leased dynamic address if a first request is unsuccessful or not answered.

In step 306, the process causes a timer to start. For example, authentication module 206 signals timer module 208 to start timing up to a specified expiration time value. The specified expiration time value may be hard-coded in timer module 208, obtained by the timer module from a configuration file, provided to the timer module from configuration module 210, etc. The particular way that the timer module determines the expiration time value is not critical.

In an embodiment, the expiration time is set to be slightly longer than a known boot delay of the device 202. Example expiration time values range from 10 seconds to 180 seconds or longer. Any suitable expiration time value may be selected based on the boot delay of the device. Further, in an embodiment discussed herein with respect to FIG. 4, the expiration time value may be determined adaptively based on actual past boot delays.

The rationale for using an expiration time approximately equal to the boot delay is to enable sufficient time for the device to complete port-based authentication to an access switch or router, but to assume that the port is open if the device has not completed authentication by the time that the boot-up sequence completes and the device is ready to use. This approach balances allowing enough time to perform authentication with allowing users to use the end station device as soon as possible after boot-up. Other trade-offs may result in selecting other expiration times, or in using other strategies for selecting the expiration time.

In step 308, a test is performed to determine if the timer has expired. If the timer is not expired, then in step 310 a test is performed to determine whether an authentication protocol packet has been received. In the context of FIG. 2, end station device 202 will have received an authentication protocol packet on interface 26 when authenticator 18 of the network infrastructure element 16 has initiated an authentication sequence. Such authentication is initiated when, for example, infrastructure element 16 is configured to enforce port-based authentication on interface 28.

If no authentication packet has been received, then control passes from step 310 to step 308 to resume timing and testing whether the timer is expired.

If an initial authentication packet has been received, then in step 314 the timer is disabled. However, the state of the packet filter is unchanged; thus, only authentication protocol traffic can flow out of the end station device. In step 316, the process tests whether authentication is completed and if not, a loop is performed until authentication completes successfully.

If an error occurs in authentication processing, then step 316 can incorporate appropriate error processing or exception handling so that step 316 does not represent an endless loop. For clarity in describing an embodiment, this description assumes that authentication eventually completes successfully at step 316 and control passes to step 312.

In an embodiment, the timer remains disabled and the packet filter remains configured to block transmitting all packets except authentication packets during any exception handling or error recovery. The rationale for this approach is that once the authenticator 18 of network infrastructure element 16 initiates authentication, the end station device should not send packets other than authentication protocol packets, or the infrastructure element may shut down the port or other adverse consequences could occur.

At step 312, the packet filter is configured to allow transmitting all packets. The rationale of the foregoing process flow in the context of FIG. 2 is that after the end station device 202 successfully authenticates to the infrastructure element 16, the infrastructure element will accept and forward all traffic without dropping the traffic or shutting down the protected interface 28.

If the timer has expired, then control passes to step 312, in which the packet filter is configured to allow transmitting all packets. Thus, if the timer has expired and the network end station device has not received an authentication protocol packet from the network infrastructure element to initiate authentication, the process assumes that the interface on the infrastructure element is open or that port-based authentication is not in use. Therefore, there is no danger that traffic from a non-authenticated device will cause the infrastructure element to shut down the interface. In response, the packet filter allows all traffic including DHCP traffic or other traffic to be transmitted on interface 26.

Referring now to FIG. 4, in one embodiment a process of adaptively determining a timer period comprises determining at step 402 one or more time values representing actual boot delays of the apparatus for a plurality of boot-up events. For example, authentication module 206 or other logic, operating in conjunction with a system clock or other timer, stores a current time value early in the boot sequence of the device 202, waits for the boot sequence to end or nearly end, and determines the then-current time. A difference of the then-current time and the stored time value indicates the total boot delay, and the resulting boot delay value is stored.

In an embodiment, in step 404 a dedicated location in nonvolatile memory is updated with an average actual boot delay of the device. For example, upon creating a new boot delay value at step 402, the process retrieves any prior value from the dedicated location, computes an updated average, and stores the result.

At step 406, the specified expiration time for the timer module is determined based on the average actual boot delay of the apparatus. In an embodiment, when the timer module 208 initiates timing in response to a signal from the authentication module at step 306 of FIG. 3, the timer module retrieves the average actual boot delay value from the dedicated location in nonvolatile memory and uses that value as the expiration time value.

As a result, using the approach herein, the expiration time value of the timer of FIG. 3 can adapt to changes in actual boot-up times or boot delays of the device in which the process of FIG. 3 is used. This approach may help to optimize the amount of time in which the process of FIG. 3 incurs in waiting for authentication to begin.

3.0 Hardware Overview

Figure 5:
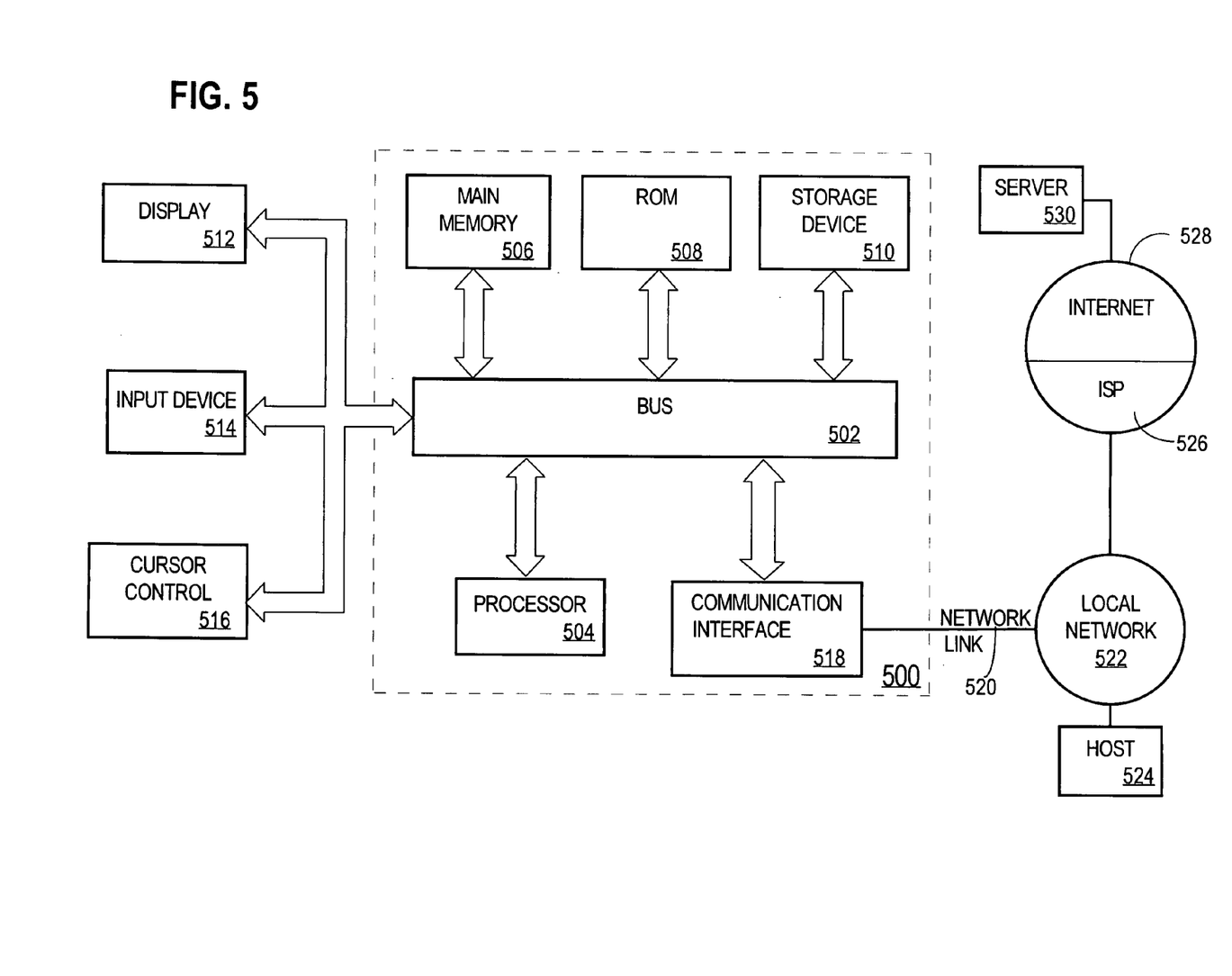
FIG. 5 is a block diagram of a computer system that may be used to implement an embodiment.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus, comprising: a network interface; a packet filter coupled to the network interface; an authentication module coupled to the packet filter; a timer module coupled to the authentication module; wherein the authentication module comprises logic which when executed causes: the timer module starting a timer having a specified expiration time; wherein the specified expiration time is greater than or equal to a boot delay of the apparatus; receiving a packet on a particular port of the network interface; determining whether the timer has reached the specified expiration time; determining whether the packet is associated with the authentication protocol; in response to determining that authentication with the particular port is required, that the timer has not reached the specified expiration time, that the packet is not associated with the authentication protocol, and that no authentication packet has been received, the packet filter blocking the packet without shutting down the particular port; in response to determining that the timer has not reached the specified expiration time and that the packet is associated with the authentication protocol, the timer module disabling the timer, transmitting one or more other packets of the authentication protocol until successfully authenticating the apparatus, and then the packet filter permitting transmission of all packets.

2. The apparatus of claim 1, wherein the authentication module comprises further logic which when executed causes the packet filter permitting transmission of all packets when the timer reaches the expiration time and no authentication protocol packet has been received.

3. the apparatus of claim 1, wherein the authentication protocol is based on Extensible Authentication Protocol (EAP) or IEEE 802.1x authentication.

4. The apparatus of claim 1, wherein the authentication protocol is any one of EAP-SIM, EAP-TLS, LEAP, EAP-AKA, PEAP, EAK-SKE, EAP-MSCHAP-V2, EAP-GSS, and EAP-TTLS.

5. The apparatus of claim 1, wherein the authentication protocol is any one of EAP-MD5, EAP-OTP, or EAP-SECUREID when used in conjunction with PEAP.

6. The apparatus of claim 1, wherein the network interface is configured to couple to a port of an authenticator.

7. The apparatus of claim 6, further comprising a Dynamic Host Control Protocol (DHCP) client comprising logic which when executed is operable to send a DHCPREQUEST message to the authenticator.

8. The apparatus of claim 1, further comprising a Dynamic Host Control Protocol (DHCP) client comprising logic which when executed is operable to send a DHCPREQUEST message to the authenticator.

9. The apparatus of claim 1, wherein the apparatus further comprises a multifunction printer.

10. The apparatus of claim 1, wherein the authentication module further comprises logic which, when executed, further causes: determining one or more time values representing actual boot delays of the apparatus for a plurality of boot-up events; storing in nonvolatile memory of the apparatus an average actual boot delay of the apparatus based on the one or more time values; and determining the specified expiration time for the timer module based on the average actual boot delay of the apparatus.

11. An apparatus, comprising: a network interface; means, coupled to the network interface, for filtering packets; means, coupled to the packet filtering means, for performing authentication of the apparatus; means, coupled to the authentication module, for timing; wherein the means for performing authentication comprises: means for causing the timing means to start a timer having a specified expiration time; wherein the specified expiration time is greater than or equal to a boot delay of the apparatus; means for receiving a packet on a particular port of the network interface; means for determining whether the timer has reached the specified expiration time; means for determining whether the packet is associated with the authentication protocol; means, responsive to determining that authentication with the particular port is required, that the timer has not reached the specified expiration time, that the packet is not associated with the authentication protocol, and that no packet associated with the authentication protocol has been received, for causing the packet filter to block the packet without shutting down the particular port; means, responsive to determining that the timer has not reached the specified expiration time and that the packet is associated with the authentication protocol, for causing the timer module to disable the timer, transmit one or more other packets of the authentication protocol until successfully authenticating the apparatus, and then for causing the packet filter to permit transmission of all packets.

12. The apparatus of claim 11, wherein the means for performing authentication further comprises means for causing the packet filter to permit transmission of all packets when the timer reaches the expiration time and no authentication protocol packet has been received.

13. The apparatus of claim 11, wherein the authentication protocol is based on Extensible Authentication Protocol (EAP) or IEEE 802.1x authentication.

14. The apparatus of claim 11, wherein the authentication protocol is any one of EAP-SIM, EAP-TLS, LEAP, EAP-AKA, PEAP, EAK-SKE, EAP-MSCHAP-V2, EAP-GSS, and EAP-TTLS.

15. The apparatus of claim 11, wherein the authentication protocol is any one of EAP-MD5, EAP-OTP, or EAP-SECUREID when used in conjunction with PEAP.

16. The apparatus of claim 11, wherein the network interface is configured to couple to a port of an authenticator.

17. The apparatus of claim 16, further comprising a Dynamic Host Control Protocol (DHCP) client comprising logic which when executed is operable to send a DHCPREQUEST message to the authenticator.

18. The apparatus of claim 11, further comprising a Dynamic Host Control Protocol (DHCP) client comprising logic which when executed is operable to send a DHCPREQUEST message to the authenticator.

19. The apparatus of claim 11, wherein the apparatus further comprises a multifunction printer.

20. The apparatus of claim 11, wherein the means for performing authentication further comprises means for: determining one or more time values representing actual boot delays of the apparatus for a plurality of boot-up events; storing in nonvolatile memory of the apparatus an average actual boot delay of the apparatus based on the one or more time values; and determining the specified expiration time for the timer module based on the average actual boot delay of the apparatus.

21. A computer-implemented method, comprising: starting a timer having a specified expiration time; receiving a packet on a particular port of a network interface; determining whether the timer has reached the specified expiration time; determining whether the packet is associated with the authentication protocol; in response to determining that the timer has not reached the specified expiration time, that the packet is not associated with the authentication protocol, and that no packet associated with the authentication protocol has been received, blocking the packet without shutting down the particular port; wherein the specified expiration time is greater than or equal to a boot delay of the apparatus; in response to determining that authentication with the particular port is required, that the timer has not reached the specified expiration time and that the packet is associated with the authentication protocol, disabling the timer, transmitting one or more other packets of the authentication protocol until successfully authenticating the apparatus, and causing a packet filter to permit transmission of all packets; wherein the method is performed by one or more computing devices.

22. The method of claim 21, further comprising causing the packet filter to permit transmission of all packets when the timer reaches the expiration time and no authentication protocol packet has been received.

23. The method of claim 21, wherein the authentication protocol is based on Extensible Authentication Protocol (EAP) or IEEE 802.1x authentication.

24. The method of claim 21, further comprising sending a Dynamic Host Control Protocol (DHCP) DHCPREQUEST message to an authenticator.

25. A non-transitory computer-readable storage medium, comprising instructions which, when executed by one or more processors, cause: starting a timer having a specified expiration time; wherein the specified expiration time is greater than or equal to a boot delay of the apparatus; receiving a packet on a particular port of a network interface; determining whether the timer has reached the specified expiration time; determining whether the packet is associated with the authentication protocol; in response to determining that authentication with the particular port is required, that the timer has not reached the specified expiration time, and that the packet is not associated with the authentication protocol, a packet filter blocking the packet without shutting down the particular port; in response to determining that the timer has not reached the specified expiration time that the packet is associated with the authentication protocol, and that no packet associated with the authentication protocol has been received, a timer module disabling the timer, transmitting one or more other packets of the authentication protocol until successfully authenticating the apparatus, and the packet filter permitting transmission of all packets.

26. The non-transitory computer-readable medium of claim 25, further comprising instructions which, when executed by the one or more processors, cause the packet filter permitting transmission of all packets when the timer reaches the expiration time and no authentication protocol packet has been received.

27. The non-transitory computer-readable medium of claim 25, wherein the authentication protocol is based on Extensible Authentication Protocol (EAP) or IEEE 802.1x authentication.

28. The non-transitory computer-readable medium of claim 25, further comprising instructions which, when executed by the one or more processors, cause sending a Dynamic Host Control Protocol (DHCP) DHCPREQUEST message to an authenticator.

* * * * *